(12) United States Patent
Kiuchi et al.

(10) Patent No.: US 7,883,272 B2
(45) Date of Patent: Feb. 8, 2011

(54) WHEEL SUPPORT BEARING ASSEMBLY

(75) Inventors: Masahiro Kiuchi, Iwata (JP); Kazuo Komori, Iwata (JP); Syougo Suzuki, Iwata (JP); Akira Fujimura, Iwata (JP); Takayasu Takubo, Iwata (JP)

(73) Assignee: NTN Corporation, Osaka (JP)

( * ) Notice: Subject to any disclaimer, the term of this patent is extended or adjusted under 35 U.S.C. 154(b) by 951 days.

(21) Appl. No.: 11/663,850

(22) PCT Filed: Sep. 12, 2005

(86) PCT No.: PCT/JP2005/016738

§ 371 (c)(1),
(2), (4) Date: Mar. 27, 2007

(87) PCT Pub. No.: WO2006/040897

PCT Pub. Date: Apr. 20, 2006

(65) Prior Publication Data

US 2008/0089628 A1 Apr. 17, 2008

(30) Foreign Application Priority Data

Oct. 8, 2004 (JP) .............................. 2004-295673
Dec. 8, 2004 (JP) .............................. 2004-354798

(51) Int. Cl.
*F16C 33/38* (2006.01)
*F16C 43/00* (2006.01)

(52) U.S. Cl. ...................... 384/544; 384/537

(58) Field of Classification Search ................ 384/537, 384/543, 544, 569, 584–586, 589, 37; 301/105.1; 29/509, 521; 403/1
See application file for complete search history.

(56) References Cited

U.S. PATENT DOCUMENTS

| | | | |
|---|---|---|---|
| 4,887,917 A | 12/1989 | Tröster et al. | |
| 4,893,960 A | 1/1990 | Beier et al. | |
| 5,226,738 A | 7/1993 | Valette et al. | |
| 5,975,765 A | * 11/1999 | Kawamura | ................... 384/537 |
| 6,022,275 A | 2/2000 | Bertetti | |
| 6,280,096 B1 | 8/2001 | Miyazaki et al. | |

(Continued)

FOREIGN PATENT DOCUMENTS

JP 63-184501 7/1988

(Continued)

OTHER PUBLICATIONS

International Search Report for International Application No. PCT/JP2008/000024, mailed Feb. 12, 2008.
English Translation of the International Preliminary Report on Patentability mailed Jul. 30, 2009, issued in corresponding International Patent Application PCT/JP2008/000024.
Patent abstract of Japan, Japanese Publication No. 2001-001710, Published Jan. 9, 2001.
Patent abstract of Japan, Japanese Publication No. 2002-283804, Published Oct. 3, 2002.
Patent abstract of Japan, Japanese Publication No. 2002-295505, Published Oct. 9, 2002.
Patent abstract of Japan, Japanese Publication No. 2001-018604, Published Jan. 23, 2001.
International Search Report of International Published Application No. PCT/JP2005/016738 (mailed Dec. 20, 2005).

(Continued)

*Primary Examiner*—Thomas R Hannon
*Assistant Examiner*—James Pilkington

(57) ABSTRACT

A wheel support bearing assembly includes an inner member having a hub axle and an inner race mounted on the hub axle. This bearing assembly includes one of an engagement recess formed in a portion of an inner peripheral surface of the inner race corresponding to an inboard edge portion of the hub axle and an engagement projection is formed in the hub axle for engagement with the engagement recess, and an annular recess formed in the outer peripheral surface of the hub axle and is opposed to an inboard side face of the inner race by the radially outward deformation of an inboard edge portion of the hub axle.

6 Claims, 9 Drawing Sheets

U.S. PATENT DOCUMENTS

| | | | |
|---|---|---|---|
| 6,422,758 | B1 | 7/2002 | Miyazaki et al. |
| 6,485,187 | B1* | 11/2002 | Meeker et al. ............ 384/537 |
| 6,497,515 | B1 | 12/2002 | Sahashi et al. |
| 6,524,011 | B2 | 2/2003 | Miyazaki et al. |
| 6,574,865 | B2 | 6/2003 | Meeker et al. |
| 6,575,637 | B1 | 6/2003 | Tajima et al. |
| 6,585,420 | B2 | 7/2003 | Okada et al. |
| 6,672,770 | B2 | 1/2004 | Miyazaki et al. |
| 6,715,926 | B2 | 4/2004 | Tajima et al. |
| 6,761,486 | B2 | 7/2004 | Miyazaki et al. |
| 6,879,149 | B2 | 4/2005 | Okada et al. |
| 2001/0046339 | A1 | 11/2001 | Miyazaki et al. |
| 2002/0068639 | A1 | 6/2002 | Tajima et al. |
| 2002/0085781 | A1* | 7/2002 | Ohkuma et al. ............ 384/544 |
| 2002/0110300 | A1 | 8/2002 | Meeker et al. |
| 2002/0146185 | A1 | 10/2002 | Miyazaki et al. |
| 2003/0002761 | A1 | 1/2003 | Hagiwara |
| 2003/0081872 | A1 | 5/2003 | Sahashi et al. |
| 2003/0103705 | A1 | 6/2003 | Miyazaki et al. |
| 2004/0037482 | A1 | 2/2004 | Ouchi |
| 2004/0120622 | A1 | 6/2004 | Tajima et al. |
| 2005/0094912 | A1 | 5/2005 | Ouchi |
| 2006/0274986 | A1 | 12/2006 | Komori et al. |
| 2008/0089628 | A1 | 4/2008 | Kiuchi et al. |
| 2008/0247700 | A1 | 10/2008 | Komori et al. |
| 2008/0310784 | A1 | 12/2008 | Ohtsuki |

FOREIGN PATENT DOCUMENTS

| | | |
|---|---|---|
| JP | 09-164803 | 6/1997 |
| JP | 9-220904 | 8/1997 |
| JP | 10-095203 | 4/1998 |
| JP | 10-196661 | 7/1998 |
| JP | 11-78408 | 3/1999 |
| JP | 11-129703 | 5/1999 |
| JP | 2001-1710 | 1/2001 |
| JP | 2001-171309 | 6/2001 |
| JP | 2001-180210 | 7/2001 |
| JP | 2002-178706 | 6/2002 |
| JP | 2002-192264 | 7/2002 |
| JP | 2002-254132 | 9/2002 |
| JP | 2002-283804 | 10/2002 |
| JP | 2002-33959 | 11/2002 |
| JP | 2002-339959 | 11/2002 |
| JP | 2002-372548 | 12/2002 |
| JP | 2003-42173 | 2/2003 |
| JP | 2003-074571 | 3/2003 |
| JP | 2003-090334 | 3/2003 |
| JP | 2003-97588 | 4/2003 |
| JP | 2004-132552 | 4/2004 |
| JP | 2004-256039 | 9/2004 |
| JP | 2005-036905 | 2/2005 |
| JP | 2005-48839 | 2/2005 |
| JP | 2005-106215 | 4/2005 |
| JP | 2005-233402 | 9/2005 |
| JP | 2006-52817 | 2/2006 |
| JP | 2006-112516 | 4/2006 |
| JP | 2006-161856 | 6/2006 |
| JP | 2006-161970 | 6/2006 |
| JP | 2006-336757 | 12/2006 |
| WO | WO02/078979 | * 10/2002 |

OTHER PUBLICATIONS

Japanese Office Action dated Nov. 17, 2009 and issued in corresponding Japanese Patent Application 2005-205185.

Japanese Office Action dated Nov. 17, 2009 and issued in corresponding Japanese Patent Application 2005-208186.

International Preliminary Report on Patentability, mailed Apr. 11, 2007 and issued in corresponding International Patent Application No. PCT/JP2005/016738.

Japanese Office Action issued Nov. 4, 2009 in corresponding Japanese Patent Application 2005-162380.

Japanese Office Action issued Nov. 4, 2009 in corresponding Japanese Patent Application 2005-162383.

Japanese Office Action issued Nov. 4, 2009 in corresponding Japanese Patent Application 2005-162384.

Japanese Office Action issued Nov. 4, 2009 in corresponding Japanese Patent Application 2005-162385.

Japanese Office Action issued Mar. 9, 2010 in corresponding Japanese Patent Application 2005-162380.

Japanese Office Action issued Mar. 9, 2010 in corresponding Japanese Patent Application 2005-162383.

Japanese Office Action issued Mar. 9, 2010 in corresponding Japanese Patent Application 2005-162384.

Japanese Office Action issued Mar. 9, 2010 in corresponding Japanese Patent Application 2005-162385.

U.S. Office Action mailed Apr. 22, 2010 in related U.S. Appl. No. 11/444,343.

Japanese Notification of Reason(s) for Rejection dated May 18, 2010, issued in corresponding Japanese Application No. 2004-295673.

Japanese Office Action issued Jun. 1, 2010 in corresponding Japanese Patent Application 2005-205184.

Chinese Office Action issued Jul. 14, 2010 in related Chinese Patent Application 200880002237.6.

Japanese Office Action issued Jul. 6, 2010 in related Japanese Patent Application 2004-354798.

Japanese Office Action issued Jul. 27, 2010 in related Japanese Patent Application 2005-162379.

U.S. Notice of Allowance mailed Sep. 22, 2010 in related U.S. Appl. No. 11/444,343.

Japanese Office Action issued Sep. 7, 2010 in corresponding Japanese Patent Application 2005-162381.

Japanese Office Action issued Nov. 2, 2010 in corresponding Japanese Patent Application 2005-162379.

Japanese Office Action issued Oct. 12, 2010 in corresponding Japanese Patent Application 2004-295673.

* cited by examiner

Arcuate Shape

Before Plastic Deformation

During Plastic Deformation

After Plastic Deformation

WHEEL SUPPORT BEARING ASSEMBLY

CROSS REFERENCE TO RELATED APPLICATIONS

This application is based on and claims priority to International Application PCT/JP2005/016738 filed Sep. 12, 2005 and Japanese Application Nos. 2004-295673 filed Oct. 8, 2004, and 2004-354798 filed Dec. 8, 2004, the disclosures of which are hereby incorporated herein by reference.

BACKGROUND OF THE INVENTION

1. Field of the Invention

The present invention relates to a wheel support bearing assembly for rotatably supporting a vehicle wheel such as used in automotive vehicles.

2. Description of the Prior Art

Hitherto, as a wheel support bearing assembly, the assembly has been known, in which a rotatable member is made up of a hub axle and an inner race press-fitted externally onto the hub axle. In this type of the wheel support bearing assembly, in order to facilitate the fixture of the inner race, an inboard end of the hub axle is staked radially outwardly so as to be brought into contact with an end face of the inner race, so that the inner race can be fixed on the hub axle under an axially preloaded condition.

However, under a condition in which a heavy load occurs during, for example, turning of an automotive vehicle, the inner race fixed on the hub axle undergoes a creep, accompanied by an increase of a bearing gap between the inner race and the hub axle which eventually leads to a short lifetime.

In view of the foregoing, as a wheel support bearing assembly designed to eliminate such inconveniences, what is shown in FIG. 7 has been suggested. See, for example, the Japanese Laid-open Patent Publication No. 2001-18604. This wheel support bearing assembly is such that a hub axle 38A and an inner race 38B mounted on an outer peripheral surface of an inboard end of the hub axle 38A are plastically coupled with each other by forming indentations 37 in one or both of the hub axle 38A and the inner race 38B and then by staking radially outwardly the inboard end of the hub axle 38A to increase or expand the diameter of the inboard end or by staking radially inwardly the inner race 38B to decrease or restrict the diameter of the inner race 38B. For the indentations 37, helical indentations such as screws, twill-lined knurls and serrations can be enumerated.

Also, as a wheel support bearing assembly for the support of an automotive drive wheel, what is shown in FIG. 12 has been suggested. See, for example, the Japanese Laid-open Patent Publication No. 9-164803. This bearing assembly is of a structure, in which a two-row of balls 25 are interposed between opposed raceway surfaces 23 and 24 in outer and inner members 21 and 22, respectively, and the inner member 22 is made up of a hub axle 29 having a wheel mounting flange 29a formed on an outer peripheral surface thereof and an inner race 30 mounted externally on an inboard end of the hub axle 29. The inner race 30 is mounted on a step 35 provided in the hub axle 29. A stem portion 33a of an outer race 33 of a constant velocity universal joint is inserted into and splined to a center bore 31 of the hub axle 29, with a step 33b of the outer race 33 urged against an inboard end face 30a of the inner race 30. In this condition, by threading a nut 34 onto a tip of the step portion 33a, the inner member 22 is axially fastened with the outer race 33 and the nut 34.

In this type of the wheel support bearing assembly, it is demanded that the inner race 30 mounted on the hub axle 29 will not drop out before the bearing assembly is mounted on an automotive vehicle. Responsive to the demand, a step 36 is formed in an inner peripheral surface of an inboard end of the inner race 30 and is held by a staked portion 29b provided in an inboard end of the hub axle 29 over the entire circumference thereof.

The wheel support bearing assembly in FIG. 12 is intended to achieve the following improvements. Namely, in the conventional standard wheel support bearing assembly for the support of the drive wheel, the step 36 of the inner race 30 shown in FIG. 12 is not provided and instead the end face of the inner race 30 is directly held by the staked portion 29b. In such case, since the staked portion 29b protrudes axially beyond the inner race 30, an additional machining to provide the staked portion 29b with an abutment face with the outer race 33 of the constant velocity universal joint is required in the conventional standard bearing assembly after the staking process. With the bearing assembly in FIG. 12, the staked portion 29b does not protrude outwardly from the step 36 of the inner race 30 and the end face of the inner race 30 can be used as an abutment face, requiring no additional machining.

However, with the wheel support bearing assembly disclosed in the Japanese Laid-open Patent Publication No. 2001-18604, there is a problem that machining of the indentations 37 required to plastically couple the hub axle 38A and the inner race 38B together requires a great deal of time, resulting in increase of the cost.

Also, the wheel support bearing assembly in FIG. 12 has the following problems.

(1) During the staking process, a staking tool interferes with an inner peripheral surface of the inner race 30, making it difficult to accomplish the staking. In this staking process, unlike the standard orbital forming process, the portion 29b of the hub axle 29 tends to be staked in an axial direction more than in a radial direction. As a result thereof, the axial deformation of the hub axle 29 becomes excessive, so that the hoop tension generated in the inner race 30 becomes high. Once the hoop tension becomes excessive, it causes cracking and/or premature exfoliation of the inner race 30.

(2) If the step 36 is formed large in the inner race 30, the area of abutment between the inner race 30 and the step 33b in the outer race 33 of the constant velocity universal joint becomes small, resulting in an excessive increase of the contact surface pressure. More precisely, when the inner member 22 is axially fastened with the outer race 33 and the nut 34, the end face of the inner race 30 and the step 33b of the outer race 33 are brought into contact. If the area of the end face of the inner race 30 is small, the contact surface pressure becomes large and it causes wear and/or abnormal noise after the bearing assembly is incorporated in the automotive vehicle.

It is to be noted that with the wheel support bearing assembly in which the staked portion 29b is not provided in the hub axle 29, the problems (1) and (2) do not occur, but it may occur that the inner race may drop out under the influence of vibrations at a time subsequent to shipment of the bearing assembly and before installation on the automotive vehicle.

SUMMARY OF THE INVENTION

An object of the present invention is to provide a wheel support bearing assembly, in which a drop-out of an inner race can be avoided by preventing a creep between a hub axle and the inner race and by minimizing the deformation of the inner race and the hoop tension developed in the inner race The wheel support bearing assembly according to the present invention is for rotatably supporting a wheel relative to a vehicle body and includes an outer member having an inner peripheral surface formed with axially spaced raceway surfaces, an inner member having an outer peripheral surface formed with raceway surfaces in alignment with the respective raceway surfaces of the outer member, and circumferentially extending rows of rolling elements interposed between the opposed raceway surfaces. The inner member is made up of a hub axle, having a wheel mounting flange, and an inner race mounted on an outer peripheral surface of an inboard end of the hub axle. This wheel support bearing assembly also includes one of the following elements (A) and (B):

Element (A): An engagement recess is formed in a portion of an inner peripheral surface of the inner race in a circumferential direction thereof corresponding to an inboard edge portion of the hub axle and an engagement projection is formed in the hub axle for engagement with the engagement recess in the inner race as a result of plastic flow of the hub axle into the engagement recess by staking the hub axle radially outwardly.

Element (B): The raceway surfaces are formed in the hub axle and the inner race, respectively, and an annular recess is provided in the outer peripheral surface of the hub axle adjacent the inboard edge portion of the hub axle, and the inboard edge portion of the hub axle positioned more inboard than the annular recess is plastically deformed radially outwardly to form a plastically deformed portion, and the plastically deformed portion is positioned opposed to a side face of the inner race facing the inboard side.

Although the engagement recess may be provided at one location in the circumferential direction, a plurality of engagement recesses are preferably employed. Also, the plastically deformed portion is positioned opposed to the side face of the inner race facing the inboard side and, for example, the plastically deformed portion may be urged against the side face of the inner race facing the inboard side and, yet, a gap may be formed between the plastically deformed portion and the side face of the inner race facing the inboard side.

According to the element (A), since the engagement recess is provided in a portion of the inner race in the circumferential direction and the engagement projection of the hub axle is engaged with the engagement recess, rotation of the inner race can be prevented by the engagement between the engagement recess and the engagement projection, and the generation of the creep can be prevented between the hub axle and the inner race. Also, the engagement between the engagement recess and the engagement projection prevents the drop-out of the inner race. The engagement recess may be of a simplified shape provided in a portion of the inner race in the circumferential direction. Also, since the engagement projection is formed by the plastic flow of the hub axle induced by staking the hub axle radially outwardly, the formation of the engagement recess and the engagement projection is easy to accomplish and they can be formed at a low cost. Also, the hub axle and the inner race are easy to assemble.

On the other hand, according to the element (B), since the inboard edge portion of the hub axle is plastically deformed radially outwardly to provide the plastically deformed portion, which is in turn positioned opposed to the side face of the inner race facing the inboard side, the drop-out of the inner race from the hub axle under the influence of vibrations can be prevented subsequent to the shipment of the bearing assembly and before assemblage onto an automotive vehicle. In such case, since the annular recess is provided in the outer peripheral surface of the hub axle adjacent the inboard edge portion and the inboard edge portion of the hub axle positioned more inboard than the annular recess is plastically deformed radially outwardly, the plastic deformation can easily be accomplished due to a constricted shape of the hub axle at the annular recess. For this reason, deformation of the inner race can be avoided during the staking process and, also, the generation of the hoop tension brought about by an excessive axial deformation of the hub axle can be avoided.

The engagement recess in the element (A) may be a groove extending axially from an inboard end face of the inner race. In such case, the engagement recess can perform a function of preventing the rotation of the inner race in a manner similar to a key groove.

Also, the engagement recess in the element (A) may be formed in a corner region between the inboard end face of the inner race and an inner peripheral surface of the inner race and have a bottom surface representing an arcuate shape in a section containing a center axis of the inner race. Where the engagement recess is formed so as to represent the arcuate shape, machining of the engagement recess is simple and the cost incurred by such processing can be further reduced.

Where the wheel support bearing assembly of the present invention is provided with the element (A), a step of a diameter greater than that of the inner peripheral surface of the inner race may be provided over the entire circumference of the inner peripheral surface of the inner race adjacent the inboard edge portion of the hub axle, and the engagement recess is formed in a portion of an inner peripheral surface of the step. The hub axle may be provided with an engagement step and the engagement projection engaged respectively in the step and the engagement recess in the inner race as a result of plastic flow induced by staking the hub axle radially outwardly.

Where the step over the entire circumference of the inner race and the engagement step engageable therewith are provided, the resistance to the drop-out of the inner race from the hub axle can be further increased.

Also, where the wheel support bearing assembly of the present invention is provided with the element (A), the inner member may have the raceway surfaces formed respectively in the hub axle and the inner race, and the bearing assembly may be of a third generation type. In the case of the wheel support bearing assembly, in which one of the raceway surfaces is formed on the inner race, the simple structure of the element (A), in which the engagement recess formed in a portion of the inner race in the circumferential direction is engaged with the engagement projection in the hub axle, is effective to obtain effects of preventing the creep and the drop-out of the inner race.

Moreover, the engagement projection of the element (A) may be formed by staking radially outwardly the inboard edge portion of the hub axle to increase the diameter of the inboard edge portion. The raceway surface in the hub axle may be surface-hardened by hardening. The inboard edge portion of the hub axle to be staked may be a non-heat treated portion. The inner race may be hardened in its entirety from a surface thereof to a core thereof by hardening.

Although in terms of increase of the rolling life, the raceway surface of the hub axle is preferably rendered to be surface-hardened having an increased hardness, a portion of the hub axle where the staking is effected is preferably left as a raw material without being heat treated in order to facilitate the staking process. Since the inner race is a small component parts having the raceway surface and having an inner peripheral surface engaged with the hub axle, it is preferred in terms of the rolling life and the resistance to frictional wear between the hub axle and the inner race that the inner race be hardened in its entirety from a surface thereof to a core thereof by hardening.

Where the wheel support bearing assembly of the present invention is provided with the element (B), a step of a diameter greater than that of the inner peripheral surface of the inner race may be provided in an inboard edge portion of the inner peripheral surface of the inner race over the entire circumference thereof, and the plastically deformed portion of the hub axle may be positioned opposed to only a side face of the step facing the inboard side.

If the step is provided in the inner race, the plastically deformed portion does not protrude outwardly of the step and the end face of the inner race can be rendered to be an abutment face relative to a stepped face of an outer race of the constant velocity universal joint, thus eliminating an additional machining to flatten the plastically deformed portion to form the abutment surface. Also, since the plastically deformed portion is engaged with only the side face of the step facing the inboard side and does not contact the inner peripheral surface of the step, generation of the hoop tension can be avoided.

Yet, where the wheel support bearing assembly of the present invention is provided with the element (B), the plastically deformed portion may be so designed that it does not protrude towards the inboard side beyond the inner race. The step of the inner race is not always necessary unless the plastically deformed portion of the hub axle protrudes outwardly from the inner race. In that case, the end face of the inner race can be rendered to be an abutment surface with the outer race of the constant velocity universal joint. Accordingly, no additional machining is required to secure the abutment surface in the plastically deformed portion.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
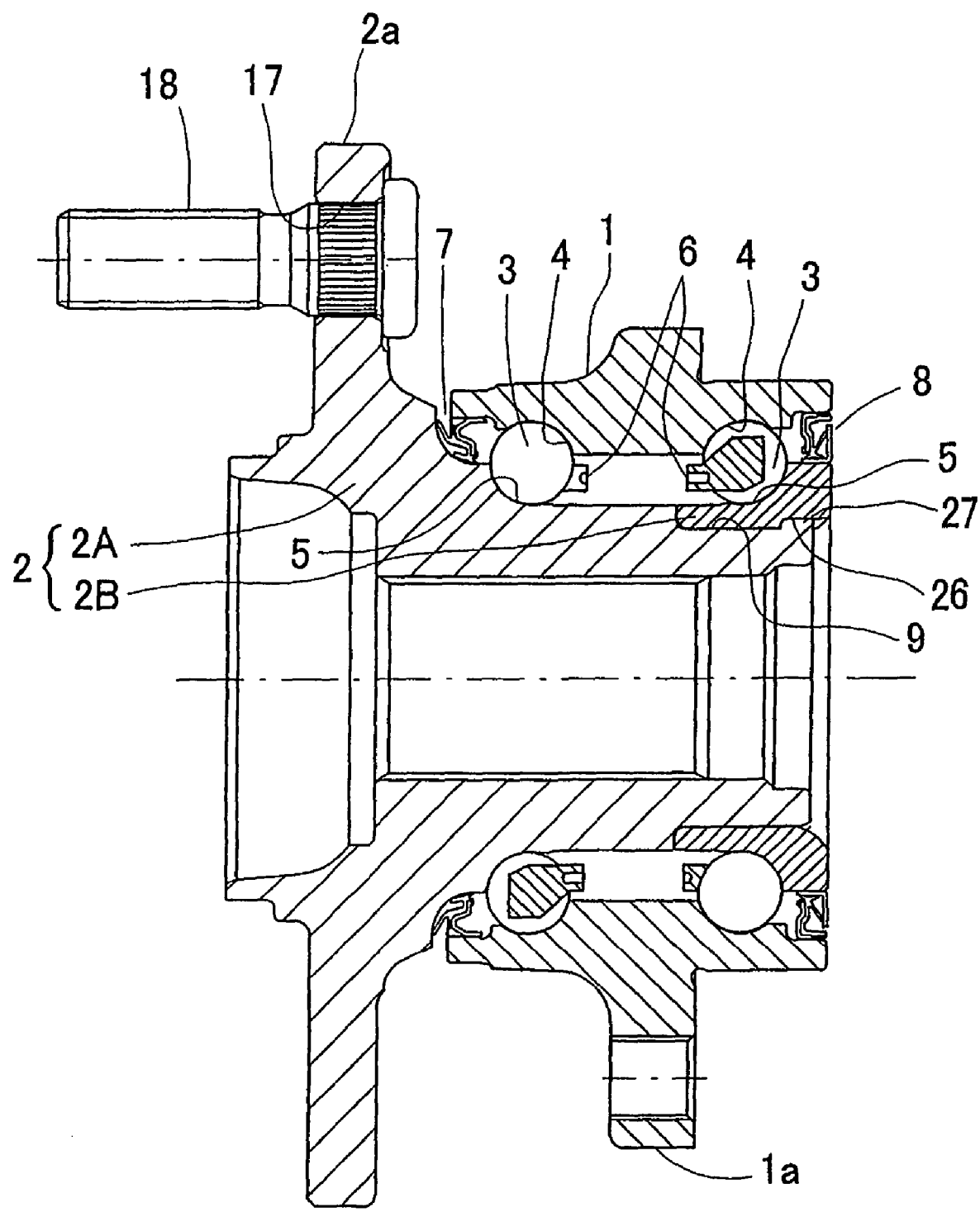
FIG. 1 is a sectional view of a wheel support bearing assembly according to a first preferred embodiment of the present invention.

The first preferred embodiment of the present invention will be described with reference to FIGS. 1 to 2B. A wheel support bearing assembly according to the first embodiment is of a inner race rotating model of a third generation type and is suitable for supporting a drive wheel of an automotive vehicle. It is to be noted that the terms "outboard" and "inboard" used in this specification represent the sides facing the outside and inside of the vehicle, respectively. In FIG. 1, a left side of the drawing sheet is an outboard side and a right side of the drawing sheet is an inboard side.

Referring to FIG. 1, the wheel support bearing assembly includes an outer member 1 having an inner peripheral surface formed with axially spaced raceway surfaces 4, an inner member 2 having an outer peripheral surface formed with axially spaced raceway surfaces 5 in alignment with the respective raceway surfaces 4, and circumferentially extending rows of rolling elements 3 interposed between the corresponding raceway surfaces 4 and 5. This bearing assembly is in the form of a dual row angular ball bearing. The raceway surfaces 4 and 5 represent an arcuate sectional shape and have their contact angles held in back-to-back relation. The rolling elements 3 are a ball and retained by a retainer for each row. An annular bearing space is formed between the outer member 1 and the inner member 2 and opposite open ends of the bearing space are sealed by respective contact-type sealing members 7 and 8.

The outer member 1 serves as a stationary member and is integrally formed in an outer peripheral surface with a vehicle body fitting flange 1a that secures the outer member 1 to a knuckle of a suspension system of an automotive body. The vehicle body fitting flange 1a is fastened to the knuckle by means of a bolt (not shown).

The inner member 2 serves as a rotatable member and is made up of a hub axle 2A having an outer peripheral surface formed with a wheel mounting flange 2a on the outboard side and an inner race 2B mounted on the outer peripheral surface of the hub axle 2A adjacent an inboard end thereof. The hub axle 2A and the inner race 2B are formed with the respective raceway surfaces 5. The hub axle 2A is coupled with an outer race (not shown) of a constant velocity universal joint, which is a coupling member of a shaft coupling.

The hub axle 2A has an inner race mounting portion 9 in the form of a step defined in the outer peripheral surface of the inboard end of the hub axle 2A, and the inner race 2B is mounted on the mounting portion 9. A brake rotor of a disc brake device and a vehicle wheel (both not shown) are fitted to the wheel mounting flange 2a of the hub axle 2A by a hub bolt 18, passing through a bolt insertion hole 17 defined in the flange 2a, and a hub nut (not shown) threadingly engaged with the hub bolt 18.

The raceway surface 5 on the hub axle 2A is surface-hardened by hardening, and an inboard edge portion of the hub axle 2A to be staked as will be described later is rendered to be a non-heat treated portion. The inner race mounting portion 9 is such that an inboard portion thereof is a non-heat treated portion as the inboard edge portion to be staked whereas an outboard portion thereof continued from the raceway surface 5 is surface-hardened as the raceway surface 5 on the hub axle 2A. The inner race 2B is hardened in its entirety from a surface thereof to a core thereof by hardening.

Figure 2A:
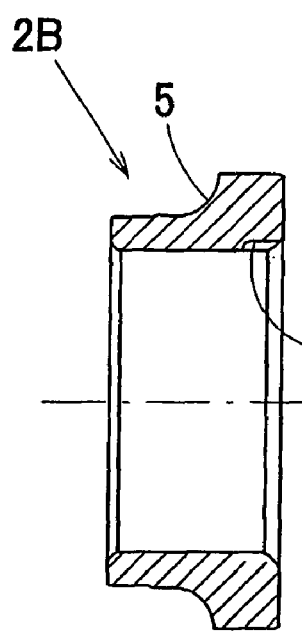
FIG. 2A is a sectional view of an inner race used in the wheel support bearing assembly.
Figure 2B:
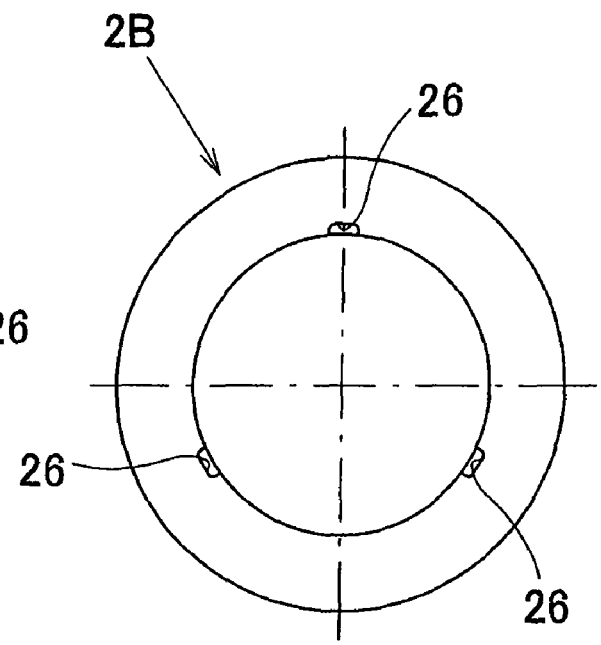
FIG. 2B is a front elevational view of the inner race.

An inner peripheral surface of the inner race 2B is formed in a circumferential direction thereof with a plurality of engagement recesses 26 as shown in FIGS. 2A and 2B. In this illustrated instance, three engagement recesses 26 are formed to be spaced a circumferential angle of 120° from each other. The engagement recesses 26 are in the form of a key groove extending axially from an end face of the inner race 2B.

Engagement projections 27 engageable respectively in those engagement recesses 26 are provided in the hub axle 2A as shown in FIG. 1. Those engagement projections 27 are formed by a staking process, in which the inboard edge portion of the hub axle 2A is staked radially outwardly to increase the diameter of the inboard edge portion while the inner race 2B is mounted on the hub axle 2A. When the diameter of the inboard edge portion of the hub axle 2A is increased by staking, a material for the hub axle 2A plastically flows into the engagement recesses 26 to form the engagement projections 27 for engagement in the respective engagement recesses 26.

According to the wheel support bearing assembly of the first embodiment, since the engagement recesses 26 are provided in the inner peripheral surface of the inner race 2B in the circumferential direction thereof and the engagement projections 27 of the hub axle 2A are engaged in those engagement recesses 26, rotation of the inner race 2B is prevented by the engagement in the circumferential direction between the engagement recesses 26 and the engagement projections 27, to thereby avoid the generation of creep. Also, the drop-out of the inner race 2B can be avoided by the engagement in the axial direction between the engagement recesses 26 and the engagement projections 27.

Since the engagement recesses 26 are of a simplified shape in the form of the key groove provided in the inner peripheral surface of the inner race 2B in the circumferential direction thereof and the engagement projections 27 are formed by the plastic flow induced by staking the inboard edge portion of the hub axle 2A radially outwardly to increase the diameter of the inboard edge portion, formation of the engagement recesses 26 and the engagement projections 27 and assemblage of the hub axle 2A and the inner race 2B are easy to accomplish. Also, the engagement recess 26 and the engagement projection 27 can be formed at a low cost. By way of example, as compared with the conventional bearing assembly, in which the indentations such as twill-lined knurls and serrations are processed, the processing cost can become inexpensive in the present invention.

Also, since the raceway surface 5 on the hub axle 2A is surface-hardened by hardening and the inboard edge portion of the hub axle 2A to be staked is not heat-treated and since the inner race 2B is hardened in its entirety from a surface thereof to a core thereof by hardening, the rolling life of each rolling surface 5 can be secured while the staking of the hub axle 2A can be carried out easily.

Figure 3A:
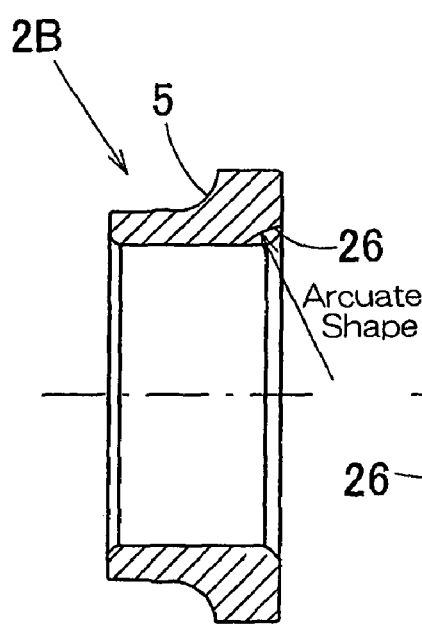
FIG. 3A is a sectional view showing another example of the inner race used in the wheel support bearing assembly.
Figure 3B:
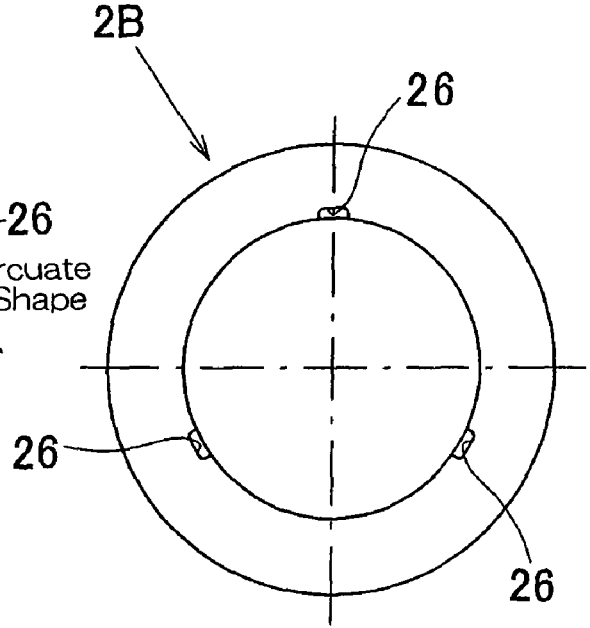
FIG. 3B is a front elevational view of the inner race of FIG. 3A.

FIGS. 3A and 3B illustrate another example of the engagement recesses 26 in the inner race 2B according to the first embodiment. The engagement recesses 26 in this example are formed in a corner region between the end face of the inboard end of the inner race 2B and the inner peripheral surface of the inner race 2B. Each of the recesses 26 has a bottom surface of a shape depicting an arcuate shape in a section containing a center axis of the inner race 2B.

With the engagement recesses 26 so formed as to represent an arcuate shape, processing of the engagement recesses 26 can easily be accomplished and the cost incurred thereby can be reduced.

Figure 4:
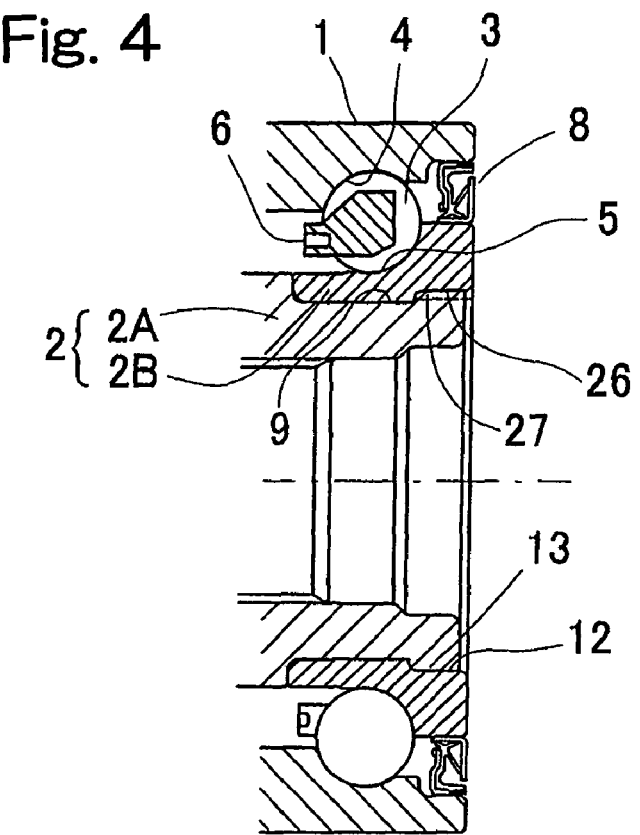
FIG. 4 is a fragmentary sectional view of the wheel support bearing assembly according to a second preferred embodiment of the present invention.
Figure 5A:
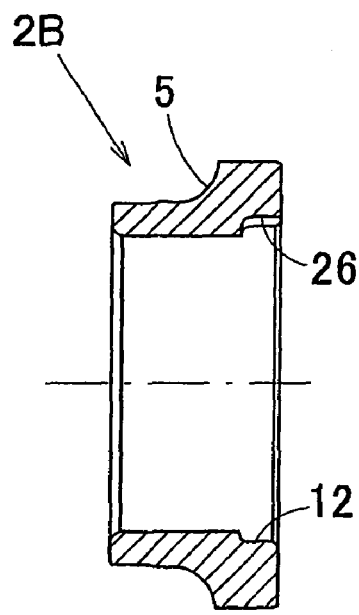
FIG. 5A is a sectional view of the inner race used in the wheel support bearing assembly of FIG. 4.
Figure 5B:
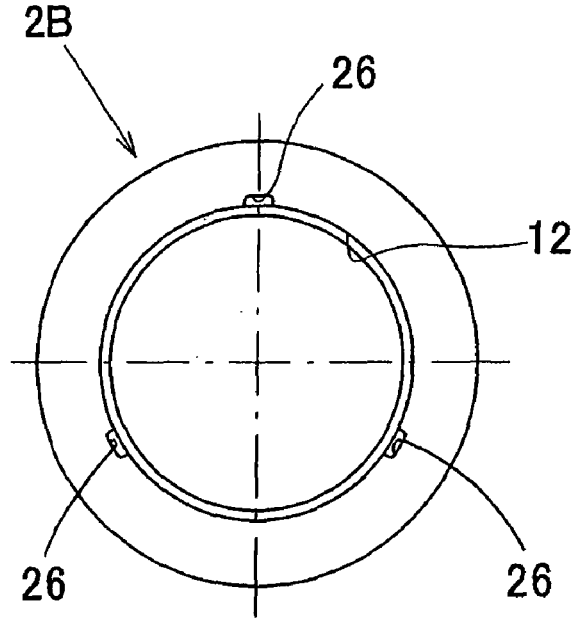
FIG. 5B is a front elevational view of the inner race of FIG. 5A.

FIGS. 4 to 5B illustrate a second preferred embodiment of the present invention. The wheel support bearing assembly according to the second embodiment differs from the wheel support bearing assembly according to the first embodiment of FIG. 1 in that the inner peripheral surface of the inner race 2B is provided in the entire circumference with a circumferential step 12 of a diameter greater than that of the inner peripheral surface thereof as shown in FIGS. 5A and 5B. Also, an inner peripheral surface of the circumferential step 12 is provided in a circumferential direction thereof with a plurality of engagement recesses 26 in a manner similar to those shown in FIGS. 2A and 2B. In the illustrated instance, three engagement recesses 26 are provided in the inner peripheral surface of the circumferential step 12 to be spaced a circumferential angle of 120° from each other. As is the case with the first embodiment, the inboard edge portion of the hub axle 2A is staked radially outwardly to increase the diameter of the inboard edge portion. By increasing the diameter of the inboard edge portion, as shown in FIG. 4, a material for the hub axle 2A flows plastically into the circumferential step 12 to form an engagement step 13 for engagement with the circumferential step 12 and also flows plastically into the engagement recesses 26 to form engagement projections 27 for engagement with the engagement recesses 26. Other structural features are identical with those in the first embodiment.

In this second embodiment, since in addition to the engagement recesses 26 partially engaged with the hub axle 2A, the inner race 2B is provided with the circumferential step 12 formed over the entire circumference of the inner peripheral surface of the inner race 2B and since the engagement step 13 of the hub axle 2A is engaged with the step 12 over the entire circumference, the resistance to the drop-out of the inner race 2B from the hub axle 2A can be further increased.

Figure 6:
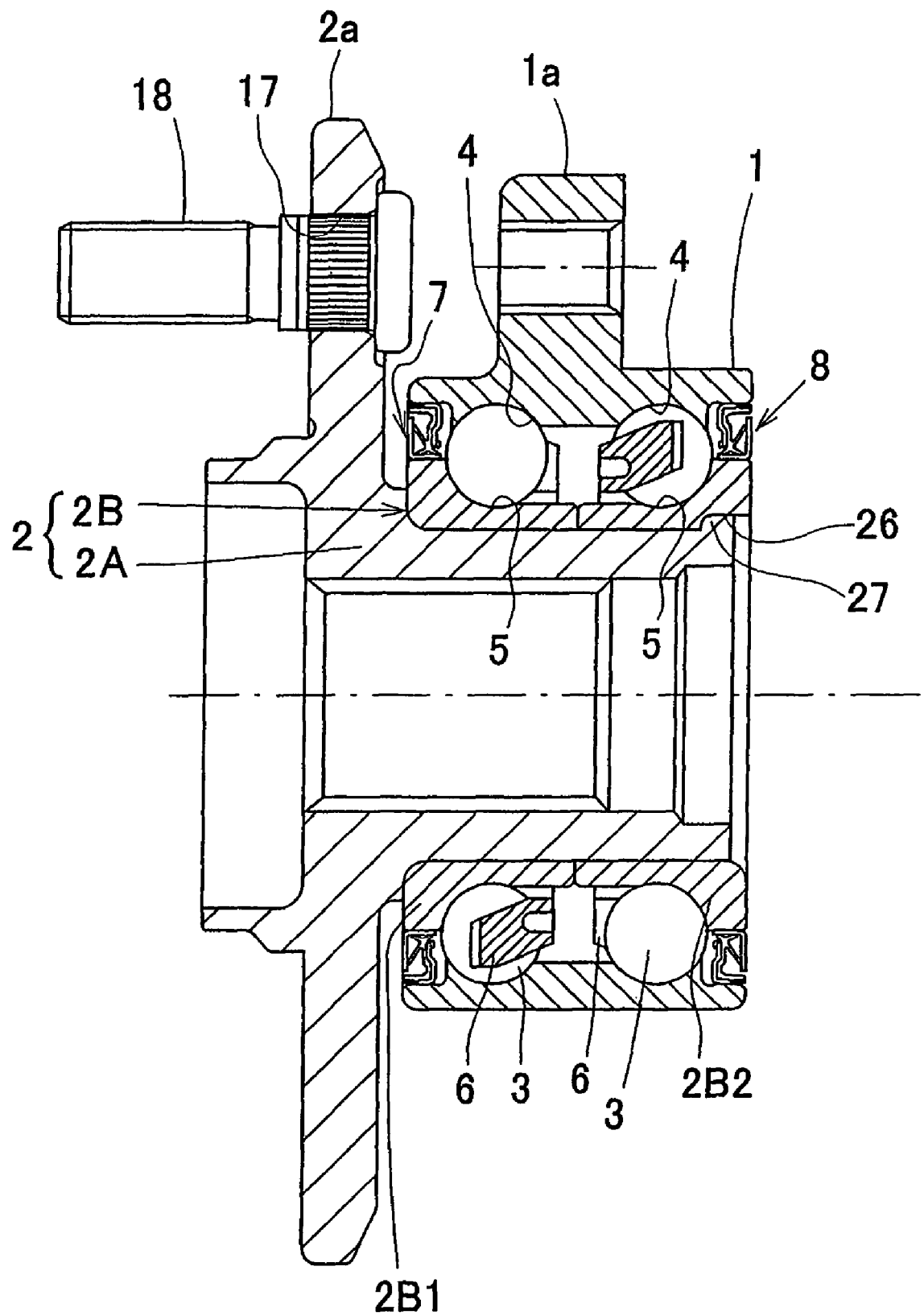
FIG. 6 is a sectional view of the wheel support bearing assembly according to a third preferred embodiment of the present invention.
Figure 7:
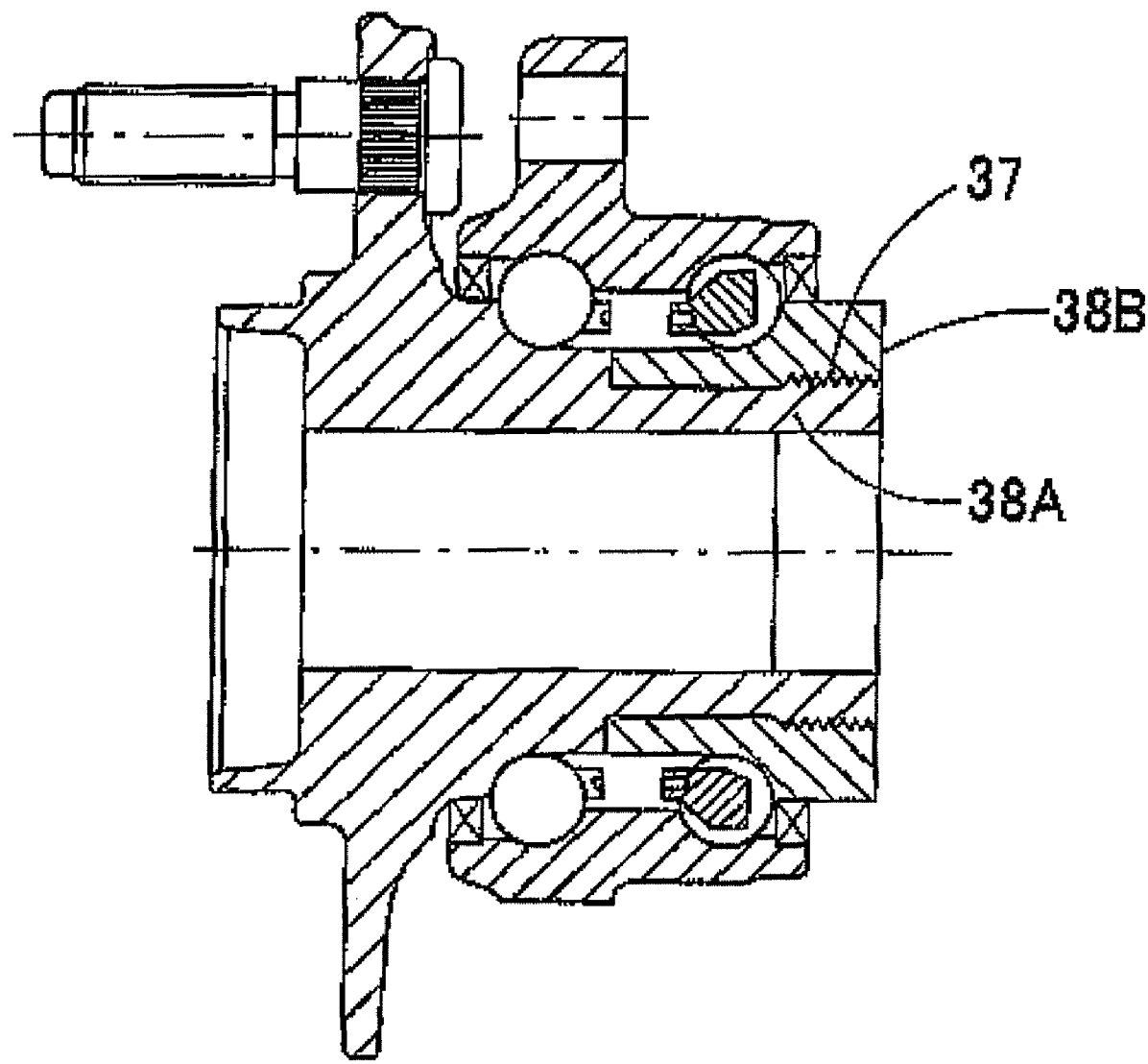
FIG. 7 is a sectional view of the conventional wheel support bearing assembly.

FIG. 6 illustrates a third preferred embodiment of the present invention, which is applied to a second generation type. This wheel support bearing assembly includes, as is the case with the first embodiment, the inner member 2 made up of the hub axle 2A and the inner race 2B mounted on the outer peripheral surface of the hub axle 2A. However, in this third embodiment, the inner race 2B is made up of two inner race segments 2B1 and 2B2 axially juxtaposed. The axially spaced raceway surfaces 5 are formed in the inner race segments 2B1 and 2B2, respectively. The engagement recesses 26 are, in this third embodiment, formed in the inner race segment 2B2 corresponding to the inboard edge portion of the hub axle 2A. Other structural features are identical with those in the first embodiment.

A fourth preferred embodiment of the present invention will now be described with reference to FIGS. 8A to 9C. This embodiment is applied to a third-generation wheel support bearing assembly of an inner race rotating model and used for supporting a drive wheel.

The wheel support bearing assembly includes an outer member 1 having a plurality of raceway surfaces 4 on an inner peripheral surface, an inner member 2 having, on an outer peripheral surface, raceway surfaces 5 confronting the respective raceway surfaces 4, and circumferentially extending rows of rolling elements 3 interposed between the raceway surfaces 4 and 5. This bearing assembly is in the form of a dual row angular ball bearing and the rolling elements 3 are in the form of a ball and are retained by a retainer 6 for each row. The raceway surfaces 4 and 5 represent an arcuate sectional shape and have their contact angles held in back-to-back relation. An annular bearing space is formed between the outer member 1 and the inner member 2 and opposite open ends of the bearing space are sealed by respective contact-type sealing members 7 and 8.

The outer member 1 serves as a stationary member, and has an outer peripheral surface formed integrally with a vehicle body fitting flange 1a. This vehicle body fitting flange 1a is secured to a knuckle installed in an automotive body (not shown) by means of a bolt (not shown).

The inner member 2 serves as a rotatable member and is made up of a hub axle 2A having an outer peripheral surface formed with a wheel mounting flange 2a on the outboard side and an inner race 2B mounted on the outer peripheral surface of the hub axle 2A adjacent an inboard end thereof. The raceway surface 5 on the outboard side is formed in the hub axle 2A and the raceway surface 5 on the inboard side is formed in the inner race 2B. The hub axle 2A has an inner race mounting portion 9 in the form of a step defined in the outer peripheral surface of the inboard end thereof, and the inner race 2B is mounted on the mounting face 9. The hub axle 2A has a center bore 14. The raceway surface 5 on the hub axle 2A is surface-hardened by induction hardening. Also, the inner race 2B is hardened in its entirety from a surface thereof to a core thereof by hardening.

Figure 8A:
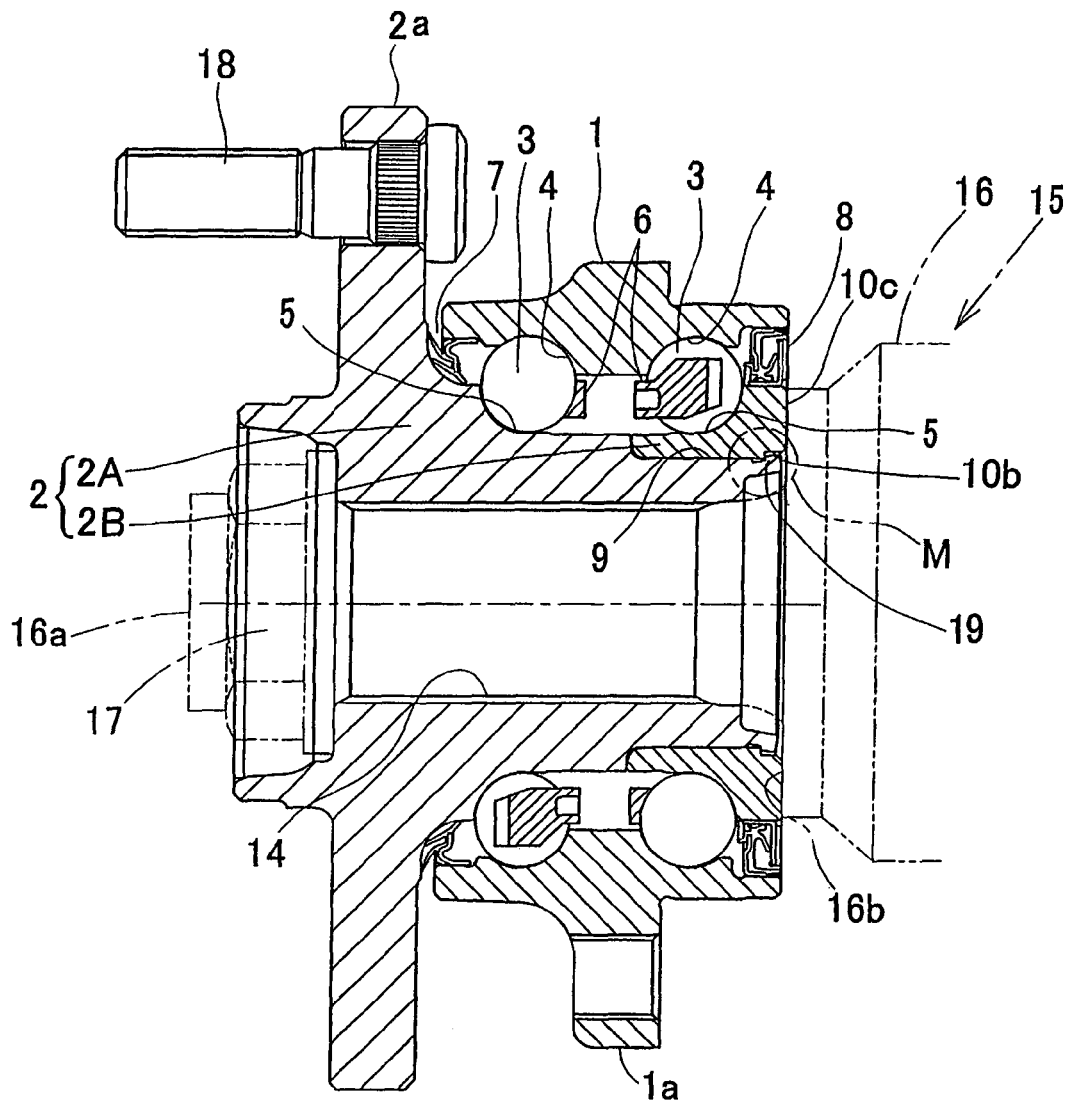
FIG. 8A is a sectional view of the wheel support bearing assembly according to a fourth preferred embodiment of the present invention.
Figure 8B:
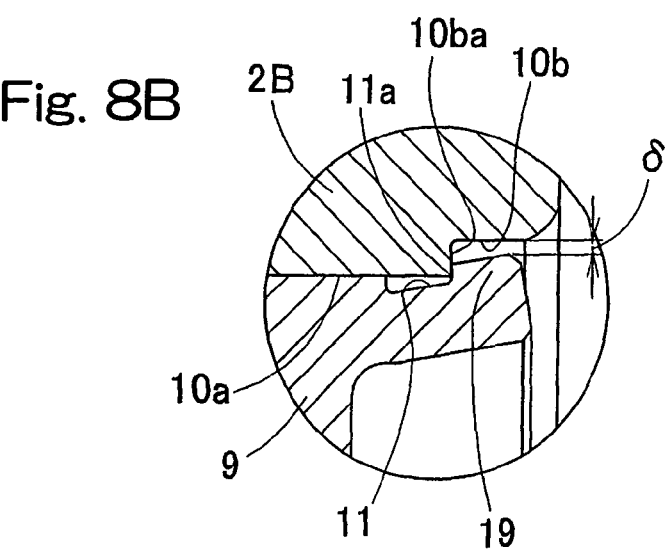
FIG. 8B is an enlarged sectional view of a portion M in FIG. 8A.

As shown in FIG. 8B illustrating a portion of the wheel support bearing assembly on an enlarged scale, an inner peripheral surface 10a of the inner race 2B has an inboard edge portion formed with a circumferential step 10b over the entire circumference thereof. The step 10b has the diameter greater than that of the inner peripheral surface 10a. The outer peripheral surface of the hub axle 2A is formed with an annular recess 11 adjacent an inboard edge portion 19 thereof. By staking or plastically deforming radially outwardly the inboard edge portion 19 so that a plastically deformed portion 19 can be positioned opposed to the inboard face of the inner race 2B, the inner race 2B is prevented from the drop-out.

Figure 9A:
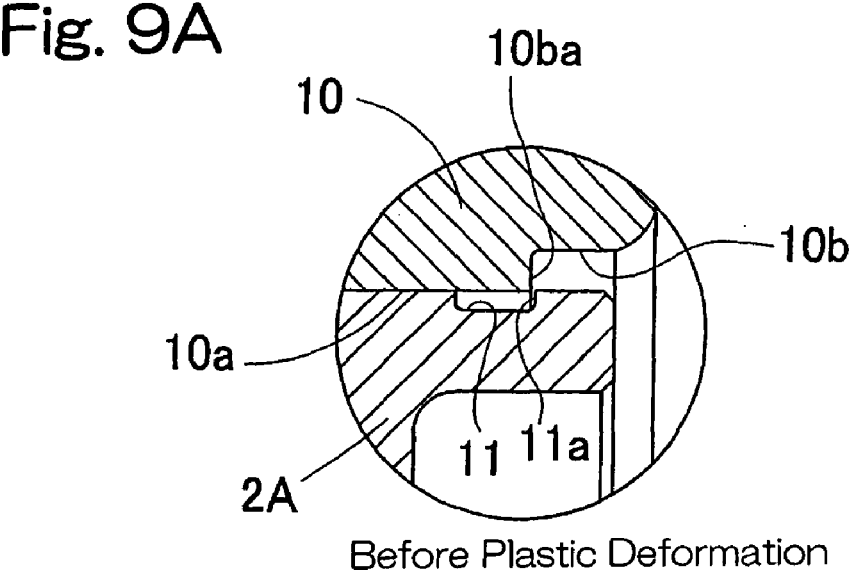
FIGS. 9A is an explanatory diagram showing a plastic processing of a hub axle used in the wheel support bearing assembly of FIG. 8A.
Figure 9B:
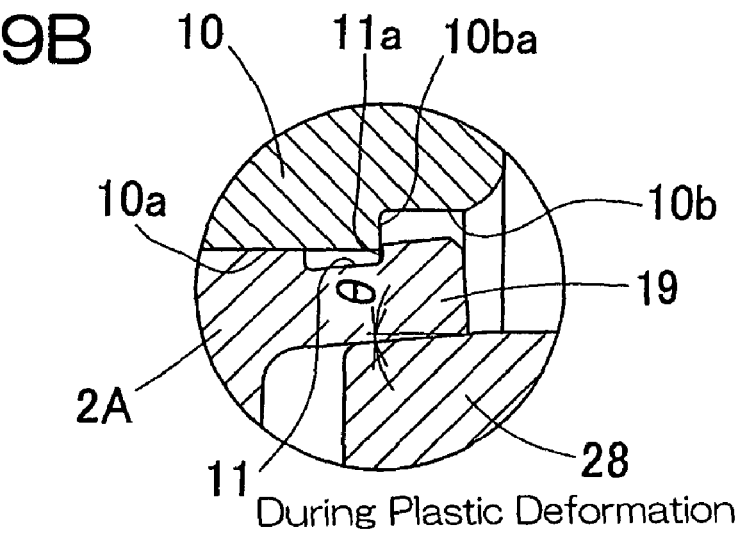
FIGS. 9B is an explanatory diagram showing a plastic processing of a hub axle used in the wheel support bearing assembly of FIG. 8A.

More specifically, before the plastic deforming as shown in FIG. 9A, the annular recess 11 of the hub axle 2A is such that a side face 11a of the recess 11 facing the outboard side is positioned more inboard than a side face 10ba of the inner race step 10b facing the inboard side is. Also, an inboard end face of the hub axle 2A is positioned more outboard than an inboard end face of the inner race 2B is. From this condition, as shown in FIG. 9B, the inboard edge portion 19 of the hub axle 2A positioned more inboard than the annular recess 11 is staked or plastically deformed radially outwardly by means of a jig 28 pushed towards an inner peripheral surface of the inboard edge portion 19. The jig 28 has an outer peripheral surface of a tapered shape decreasing in diameter toward a tip thereof.

Figure 9C:
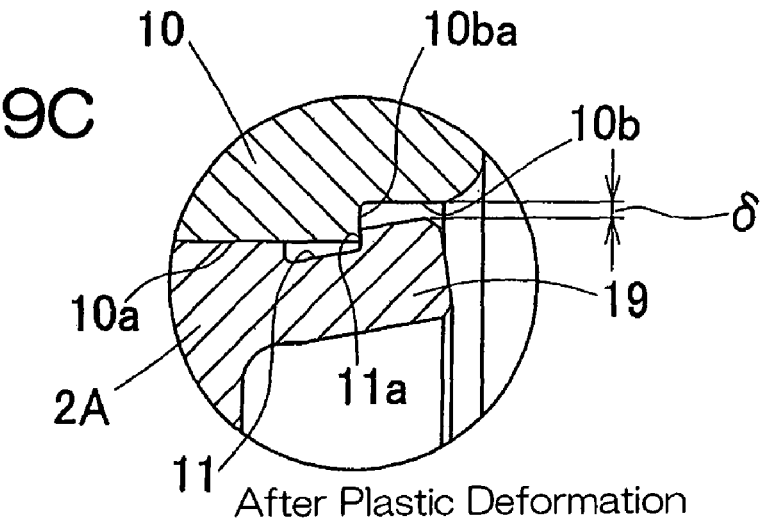
FIGS. 9C is an explanatory diagram showing a plastic processing of a hub axle used in the wheel support bearing assembly of FIG. 8A.

Thereby, as shown in FIG. 9C, the side face 11a of the annular recess 11 facing the outboard side is positioned opposed only to the side face 10ba of the inner race step 10b facing the inboard side. At this time, the plastically deformed portion 19 of the hub axle 2A does not protrude towards the inboard side beyond the inner race 2B. Also, a gap δ is formed between an outer peripheral surface of the plastically deformed portion 19 and the step 10b in the inner race 2B.

Figure 11:
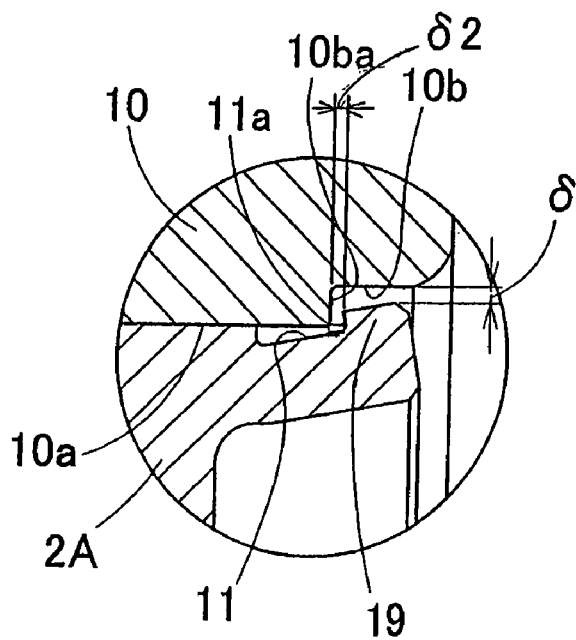
FIG. 11 is an enlarged fragmentary sectional view showing a different modified example of the plastically deformed portion in the hub axle of the wheel support bearing assembly of FIG. 8A.
Figure 12:
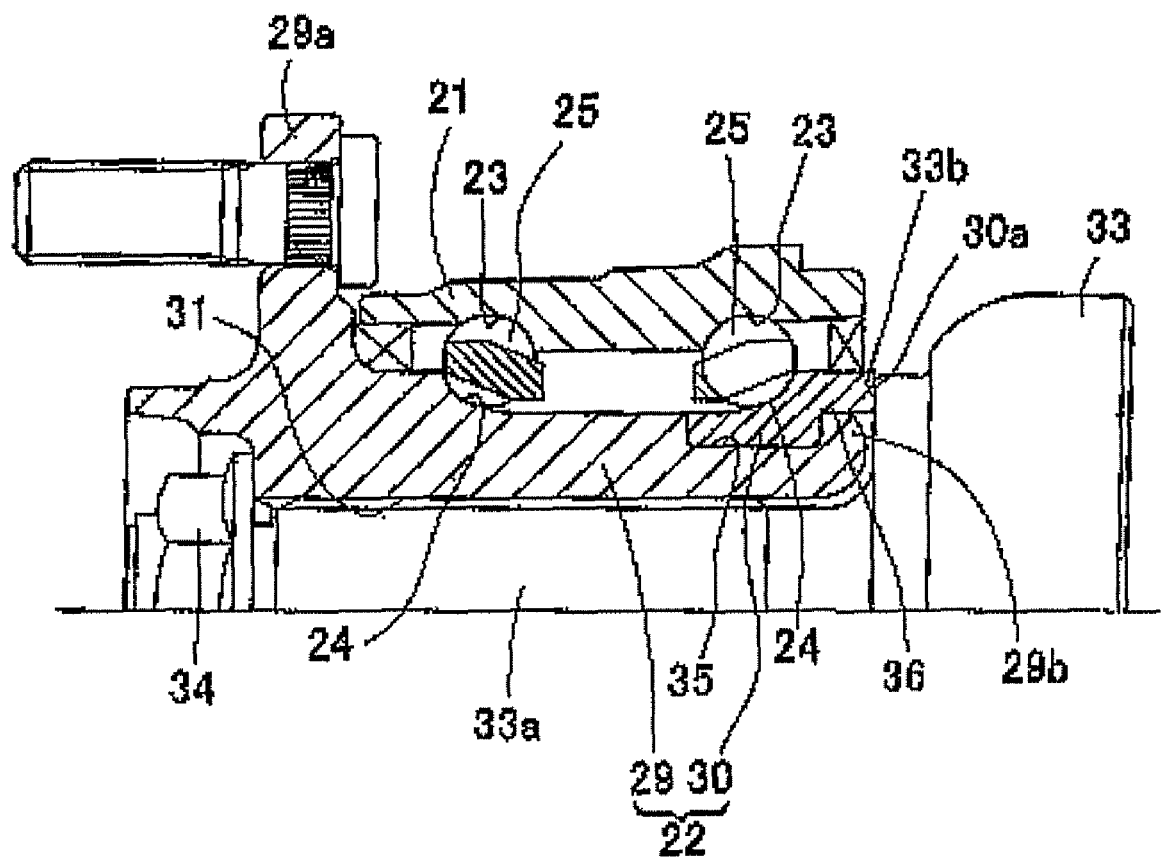
FIG. 12 is a sectional view of the conventional wheel support bearing assembly.

In the example shown in FIGS. 9C and 8B, the plastically deformed portion 19 is urged against the side face 10ba of the inner race 2B facing the inboard side, but as shown in FIG. 11, a gap δ2 may be formed between the plastically deformed portion 19 and the side face 10ba of the inner race 2B.

During the mounting of this wheel support bearing assembly onto the automotive vehicle, a stem portion 16a of an outer race 16, which defines a coupling member of a constant velocity universal joint 15, is inserted into the center bore 14 of the hub axle 2A and then splined to the hub axle 2A. The outer race 16 of the constant velocity universal joint 15 is coupled with the inner member 2 by fastening a nut 17 engageable with a tip of the stem portion 16a. At this time, a stepped face 16b provided in the outer race 16 of the constant velocity universal joint 15 and facing the outboard side is urged against an end face 10c of the inner race 2B facing the inboard side to allow the inner member 2 to be fastened axially between the outer race 16 of the constant velocity universal joint 15 and the nut 17. The wheel mounting flange 2a is formed with the outboard end of the hub axle 2A on the outboard side and a vehicle wheel (not shown), which serves as a drive wheel, is fitted to the wheel mounting flange 2a through a brake rotor (not shown) by means of a bolt 18.

According to the wheel support bearing assembly of the foregoing construction, since the annular recess 11 is provided in the outer peripheral surface of the hub axle 2A adjacent the inboard edge portion 19 and the inner race 2B is designed not to drop out by plastically deforming radially outwardly the inboard edge portion 19 and by opposing the resultant plastically deformed portion 19 to the side face 10ba of the inner race 2B facing the inboard side, the drop-out of the inner race 2B from the hub axle 2A under the influence of vibrations subsequent to the shipment of the bearing assembly and before mounting onto the automotive vehicle can be prevented. Also, since the annular recess 11 has a constricted shape, the radially outward plastic deformation of the inboard edge portion 19 can easily be accomplished. For this reason, any deformation of the inner race 2B can be avoided during this staking process. Also, by adjusting the axial position of the annular recess 11 in the hub axle 2A, the position of the plastically deformed portion 19 can be adjusted.

In this fourth embodiment, since the step 10b of the diameter greater than that of the inner peripheral surface 10a of the inner race 2B is provided in the inboard edge portion of the inner peripheral surface 10a over the entire circumference thereof and since the plastically deformed portion 19 of the hub axle 2A is arranged inside the step 10b and does not protrude towards the inboard side beyond the inner race 2B, the end face of the inner race 2B can be used as an abutment surface with the outer race 16 of the constant velocity universal joint 15 and, therefore, an additional machining required to form the abutment surface is unnecessary, unlike the conventional bearing assembly.

Also, since the plastically deformed portion 19 of the hub axle 2A is positioned opposed only to the side face 10ba of the inner race step 10b of the inner race 2B and is not in contact with the inner peripheral surface of the step 10*b*, the deformation of the inner race 2B during the staking or plastic deforming process of the inboard edge portion 19 and the hoop stress generated in the inner race 2B can be minimized.

Even though the step 10*b* is provided in the inner race 2B, reduction of the radial length of the end face of the inner race 2B can be minimized when the radial depth of the step 10B is chosen to be minimum. Thereby, increase of the contact surface pressure between the stepped face 16*b* of the outer race 16 and the end face of the inner race 2B can be avoided, eliminating a cause of wear and generation of abnormal noise in the automotive vehicle.

Figure 10:
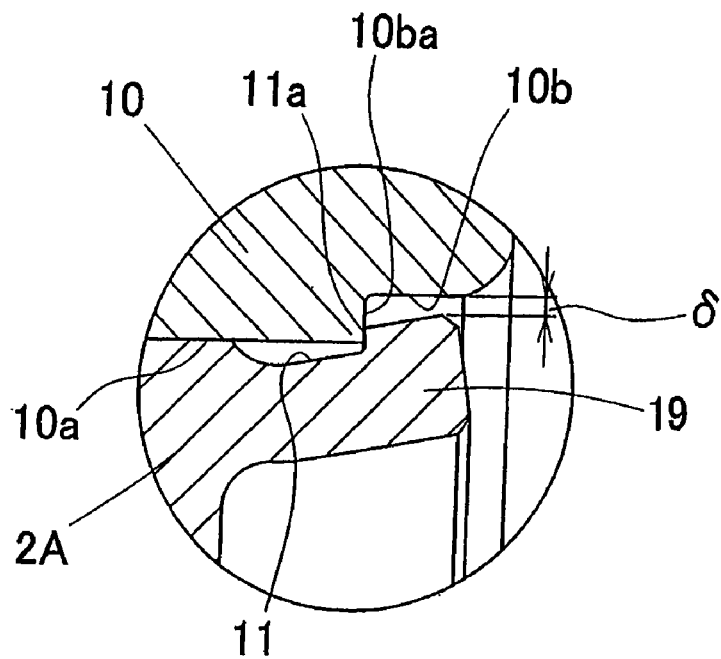
FIG. 10 is an enlarged fragmentary sectional view showing a modified example of a plastically deformed portion in a hub axle of the wheel support bearing assembly of FIG. 8A.

It is to be noted that although in the fourth embodiment the annular recess 11 of the hub axle 2A is rendered to have a square sectional shape in which the opposed side faces are positioned perpendicular to the outer peripheral surface of the hub axle 2A, the annular recess 11 may have, for example, a side face, facing the inboard side, of an arcuate sectional shape, as shown in FIG. 10. By rendering one side face of the annular recess 11 to represent an arcuate sectional shape, concentration of stresses in the annular recess 11 during the plastic deformation subjected to the inboard edge portion 19 of the hub axle 2A can be lessened.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly to rotatably support a wheel relative to a vehicle body, comprising:
    an outer member having an inner peripheral surface formed with axially spaced raceway surfaces;
    an inner member having an outer peripheral surface formed with axially spaced raceway surfaces in alignment with the respective raceway surfaces of the outer member;
    circumferentially extending rows of rolling elements interposed between the opposed raceway surfaces;
    the inner member being made up of a hub axle, having a wheel mounting flange, and an inner race mounted on an outer peripheral surface of an inboard end of the hub axle, and the raceway surfaces being formed in the hub axle and the inner race, respectively;
    an annular recess formed in the outer peripheral surface of the hub axle adjacent the inboard edge portion of the hub axle;
    the inboard edge portion of the hub axle being positioned more inboard than the annular recess being plastically deformed radially outwardly to form a plastically deformed portion; and
    the plastically deformed portion being positioned opposed to a side face of the inner race facing the inboard side so that a surface within the annular recess facing an outboard side engages the side face of the inner race facing the inboard side to thereby prevent a drop-out of the inner race.

2. The wheel support bearing assembly as claimed in claim 1, wherein the plastically deformed portion is urged against the side face of the inner race facing the inboard side.

3. The wheel support bearing assembly as claimed in claim 1, wherein a gap is provided between the plastically deformed portion and the side face of the inner race facing the inboard side.

4. The wheel support bearing assembly as claimed in claim 1, wherein
    a step of a diameter greater than that of an inner peripheral surface of the inner race is provided in an inboard edge portion of the inner peripheral surface of the inner race over the entire circumference thereof, and
    the plastically deformed portion of the hub axle is positioned opposed to only a side face of the step facing an inboard side.

5. The wheel support bearing assembly as claimed in claim 1, wherein the plastically deformed portion does not protrude towards an inboard side beyond the inner race.

6. The wheel support bearing assembly as claimed in claim 1, wherein the wheel support bearing assembly is operable to rotatably support a wheel, which serves as a drive wheel, relative to the vehicle body.

* * * * *